(12) United States Patent
Suzuki et al.

(10) Patent No.: US 7,290,906 B2
(45) Date of Patent: Nov. 6, 2007

(54) VEHICLE LAMP AND METHOD OF USE

(75) Inventors: Nobuyuki Suzuki, Tokyo (JP);
Hiroyuki Chikama, Tokyo (JP);
Hidetaka Okada, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 18 days.

(21) Appl. No.: 10/939,964

(22) Filed: Sep. 14, 2004

(65) Prior Publication Data

US 2005/0111235 A1  May 26, 2005

(30) Foreign Application Priority Data

Nov. 21, 2003  (JP)  ............... 2003-392935

(51) Int. Cl.
*F21V 9/00*  (2006.01)
(52) U.S. Cl. .................. 362/511; 362/328; 362/507; 362/517; 362/545; 362/555; 362/610; 362/612; 362/613; 362/800
(58) Field of Classification Search ............... 362/555, 362/558, 307–310, 327, 328, 507, 516–518, 362/800, 511, 545, 610, 612, 613
See application file for complete search history.

(56) References Cited

U.S. PATENT DOCUMENTS

| 6,097,549 A * | 8/2000 | Jenkins et al. ............... 359/726 |
| 6,637,923 B2 | 10/2003 | Amano ....................... 362/545 |
| 2003/0086276 A1 * | 5/2003 | Ohtsuka et al. ............. 362/511 |

* cited by examiner

*Primary Examiner*—Stephen F Husar
*Assistant Examiner*—Meghan K. Dunwiddie
(74) *Attorney, Agent, or Firm*—Cermak Kenealy & Vaidya LLP

(57) ABSTRACT

A lamp can include LED lamps as a light source. An optical guide path including a first reflecting surface and a second reflecting surface can be provided between the LED lamp and a lens that radiates an illumination light. The optical guide path can be integrally composed of a high-refractivity material. Thus, the light passing through the optical guide path can more efficiently reach the lens. In addition, the integral optical guide path requires less assembly and thus can improve accuracy of assembly and can possibly result in a large gain in the amount of light emitted from the lamp.

20 Claims, 3 Drawing Sheets

VEHICLE LAMP AND METHOD OF USE

This application claims the priority benefit under 35 U.S.C. §119 of Japanese Patent Application No. 2003-3929354, filed on Nov. 21, 2003, which is hereby incorporated by reference.

BACKGROUND OF THE INVENTION

1. Filed of the Invention

The present invention relates to a lamp, and more particularly to a configuration of a vehicle lamp that employs LED lamps as a light source, along with its method of use.

2. Description of the Related Art

A vehicle lamp may be configured to employ LED lamps as a light source. In such a case, initially, the LED lamps can be aligned in a matrix of rows and columns, for example, on a surface of a printed circuit board. The LED lamps can be covered from above using a cover lens, such as a fish-eye lens, which has an appropriate lens cut. A lamp having a wide area of light emission is problematic, however, because it requires many LED lamps, which elevates costs and increases power consumption and heat radiation.

To solve such a problem, plural LED lamps can be aligned in a row so as to direct their optical axes perpendicular to a certain irradiation direction of the lamp. Fresnel lenses are located adjacent and corresponding to the LED lamps to change light from each LED lamp into a parallel light flux. In an optical path of the parallel light flux, plural stepped segments are provided in the irradiation direction of the lamp. Each segment has a reflective element and a step portion. This technology is effective to reduce the number of LED lamps because it allows replacement of the LED lamp type that includes rows and columns with an LED lamp type that includes one row (see JP-A 2003-059312, corresponding to U.S. Pat. No. 6,637,923 B2 which is hereby incorporated by reference).

In the above conventional configuration, the LED lamp also has a lens portion in addition to the Fresnel lens to achieve the parallel light flux. Thus, it can not completely achieve a parallel light flux which results in a considerable amount of light beams radiated in directions other than expected. These misdirected light beams can not be utilized as irradiation light from the lamp, resulting in a problem due to a lowered amount of light from the lamp.

In the above conventional configuration, separate components such as LED lamps, Fresnel lenses and segments are assembled. Accordingly, variations in accuracy during assembly or in component precision may cause variations in performance among products and can possibly complicate tests in quality control.

SUMMARY OF THE INVENTION

The present invention provides, among other things, a solution to and/or reduction in the above problems in the art, and provides various apparatus and methods for providing a high quality high output LED lamp that is efficient to produce. In accordance with an aspect of the invention, a lamp can include an LED lamp as a light source, a direction change structure or means configured to change the direction of light emitted from the LED lamp into the irradiation direction, and a light distribution pattern formation structure or means configured to impart an appropriate light distribution pattern to light radiated in the irradiation direction. The direction change structure can include two reflecting surfaces including a first reflecting surface and a second reflecting surface arranged to provide inner total reflection at an interface between a high-refractivity material and atmosphere. The light distribution pattern formation structure can include a diffusion lens at an interface between a high-refractivity material and atmosphere. An optical guide path extending from the LED lamp to the two reflecting surfaces and the lens can be composed of a high-refractivity material.

In accordance with another aspect of the invention, the light emitted from the LED lamp can be reflected twice at the reflecting surfaces to redirect it toward the irradiation direction in the optical guide path extending from the LED lamp to the lens. The optical guide path can be composed of a high-refractivity material. The light emitted from the LED lamp can include differently oriented beams, which are totally reflected at the interface between the high-refractivity material and atmosphere and confined in the high-refractivity material. This operation is extremely effective to reduce the amount of light that is lost and in possibly achieving a brighter lamp.

Adjustment of the number of the second reflecting surfaces relative to the first reflecting surfaces or an increase/decrease in the number of the first reflecting surfaces can freely vary, and can vary in accordance with the number of light-emitting units per LED lamp. This can be extremely effective to provide higher design flexibility and improve the beauty of the lamp and in particular a vehicle lamp.

In accordance with another aspect of the invention a lamp device can include an LED lamp capable of emitting light and an optical guide path extending from adjacent said LED lamp. The optical guide path can be integrally formed from a high-refractivity material and include an integral first reflecting surface and an integral second reflecting surface. The first and second reflecting surfaces can be formed from an interface between the high-refractivity material and atmosphere. The first and second reflecting surfaces can also be configured to re-direct light emitted from the LED lamp through the optical guide path.

In accordance with yet another aspect of the invention, a method for using a lamp can include providing a lamp that includes an LED lamp and an optical guide path extending from adjacent said LED lamp. The optical guide path can include a high-refractivity material portion, a plurality of first reflecting surfaces, a plurality of second reflecting surfaces, and at least one lens. The method can also include illuminating the LED lamp, dividing the light into at least two separate light beams by the plurality of first reflecting surfaces of the optical guide path, directing the at least two separate light beams by the plurality of second reflecting surfaces, and emitting light via the at least one lens.

Still other objects, features, and attendant advantages of the present invention will become apparent to those skilled in the art from a reading of the following detailed description of embodiments constructed in accordance therewith, taken in conjunction with the accompanying drawings.

BRIEF DESCRIPTION OF THE DRAWINGS

The present invention will be more fully understood from the following detailed description with reference to the accompanying drawings, in which.

DETAILED DESCRIPTION OF PREFERRED EMBODIMENTS

Figure 1:
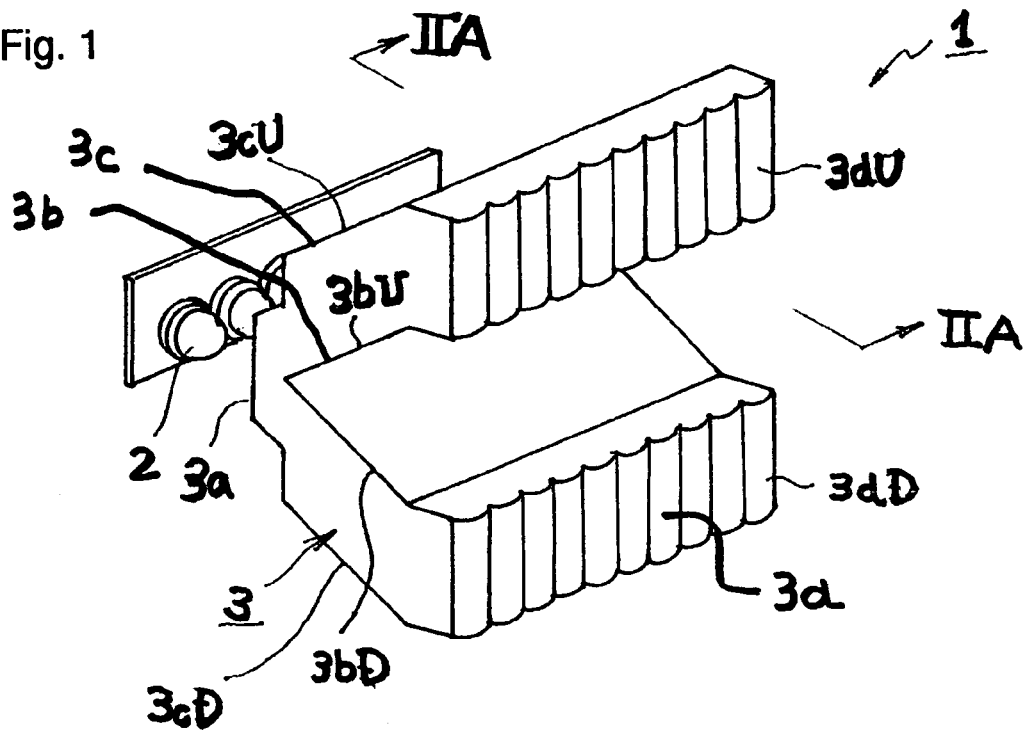
FIG. 1 is a partial exploded perspective view of a first embodiment of a lamp made in accordance with the principles of the present invention.

The present invention will now be described with reference to the exemplary embodiments shown in the drawings. Referring to the drawing figures, like reference numerals designate identical or corresponding elements throughout the several figures.

Figure 2:
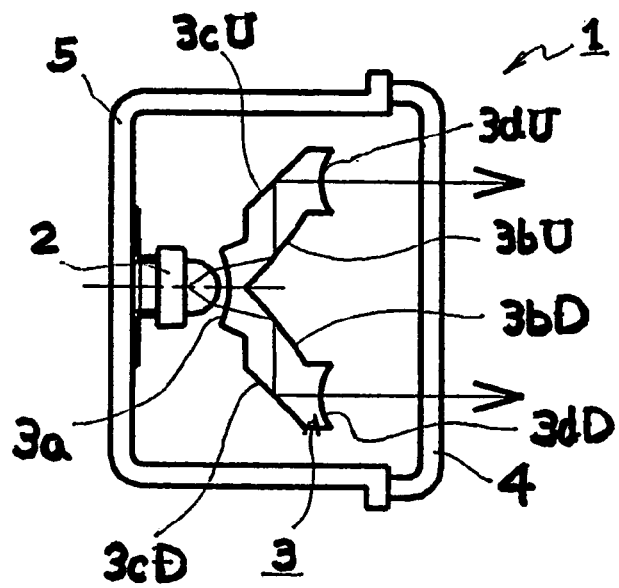
FIG. 2 is a cross-sectional view taken along line IIA-IIA of FIG. 1.

FIGS. 1 and 2 show a first embodiment of a lamp 1 made in accordance with the principles of the present invention. The lamp 1 employs LED lamps 2 as a light source. The lamp 1 as described with respect to FIG. 1 has a horizontally wide shape. However, if a vertically tall shape is required or desired, appropriate structures of the lamp as described below can be rotated 90°.

An arbitrary number of LED lamps 2 can be aligned horizontally at an appropriate interval, for example, on a printed circuit board. This enables the lamp 1 to have a desired horizontal width. An optical guide path 3 can be located in front of the LED lamps 2. The optical guide path 3 is preferably integrally formed of a transparent resin material with a refractive index higher than that of atmosphere, such as an acrylic resin or a polycarbonate resin.

The optical guide path 3 can include an introduction section 3a for introducing the light from the LED lamp 2 into the optical guide path 3. A first reflecting surface 3b and a second reflecting surface 3c can be configured to change the traveling direction of light received from the introduction section 3a. A lens portion 3d can be provided to distribute and radiate light externally from the optical guide path 3.

The configuration of the optical guide path 3 of FIGS. 1 and 2 is more specifically described below. The introduction section 3a can be configured to correspond to the number of the LED lamps 2. In this case, the section for radiating light from the LED lamp 2 is shaped as a lens, so as to lead the light from the LED lamp 2 into the optical guide path 3 efficiently.

At the rear in front of the introduction section 3a, two first reflecting surfaces 3b can be provided to split the light from the LED lamp 2 in two: an upward light and a downward light. Therefore, an upper first reflecting surface 3bU can be provided in the upper half of the optical guide path 3 at an elevation of approximately 45° and a lower first reflecting surface 3bD can be provided in the lower half thereof at an angle of approximately 45° to split the light in two.

The upper first reflecting surface 3bU and the lower first reflecting surface 3bD can be composed of a transparent, high-refractivity material having a refractive index of about 1.5. As shown above, an inner surface at the interface with atmosphere reflects or totally reflects the light that impinges on the interface at approximately 45°. Accordingly, it may not be necessary to use a mirror finishing by vacuum evaporation of aluminum or silver.

Therefore, formation of the upper first reflecting surface 3bU and the lower first reflecting surface 3bD preferably separates the optical guide path 3 in two directions: an upward direction and a downward direction. At separate locations spaced an appropriate distance from each other, second reflecting surfaces 3c can respectively be provided to change the traveling directions of respective light into the irradiation direction of the lamp 1.

In the upper first reflecting surface 3bU an upper second reflecting surface 3cU can be provided to change the direction of light traveling upward from the upper first reflecting surface 3bU into the horizontal direction. Similarly, for light traveling downward from the lower first reflecting surface 3bD, a lower second reflecting surface 3cD can be provided to change the direction of light into the horizontal direction.

After the light direction is changed by the upper second reflecting surface 3cU and the lower second reflecting surface 3cD into the irradiation direction of the lamp 1, the light can pass through a portion of the optical guide path 3 provided in front of the respective second reflecting surfaces 3c (U, D). Then, the light preferably passes through lenses 3d (an upper lens 3dU and a lower lens 3dD), to form a light distribution characterized for the lamp 1.

In practical implementations, portions of the lenses 3d may be convex, for example, to allow the portions of the lenses 3d to directly form the light distribution characteristic. However, there may be some instances in which design requirements require that these portions of the lenses 3d be configured to be flat, and lens cuts may be applied to another portion, such as a cover lens 4, to form a desired light distribution characteristic. A casing 5 can be provided to form a housing about the LED lamp 2 and to retain a cover lens 4 in place in front of the optical guide path 3.

Operation and effect of a lamp 1 thus configured will be described next. In the above described embodiment of the present invention, the optical guide path 3 can extend from the LED lamp 2 to the lens 3d and can be entirely and integrally made from a high-refractivity material. Therefore, even when portions of the light emitted from the LED lamp 2 travel in inefficient and different directions, but reach the interface between the high-refractivity material and atmosphere, most of this light can then be totally reflected inwardly therefrom via the optical guide path 3 having a higher refractive index.

Therefore, almost all the light emitted from the LED lamp 2 can be radiated as the irradiation light of the lamp 1 from the lens 3d and through the optical guide path 3. In comparison to a lamp in which light is propagated through the atmosphere and converted by mirror reflection into the irradiation direction, the loss in the amount of light within the optical path extending from the LED lamp 2 to the lens 3d can be reduced. This is advantageous to achieve a brighter vehicle lamp.

In accordance with an embodiment of the present invention, the optical guide path 3 extending from the LED lamp 2 to the lens 3d can be entirely solidified and integrated. A high-performance lamp 1 thus designed can be produced without any reduction of accuracy during assembly. This construction makes it possible to improve the quality and lower the cost of making a lamp, while possibly improving yields and reducing process steps.

Figure 3:
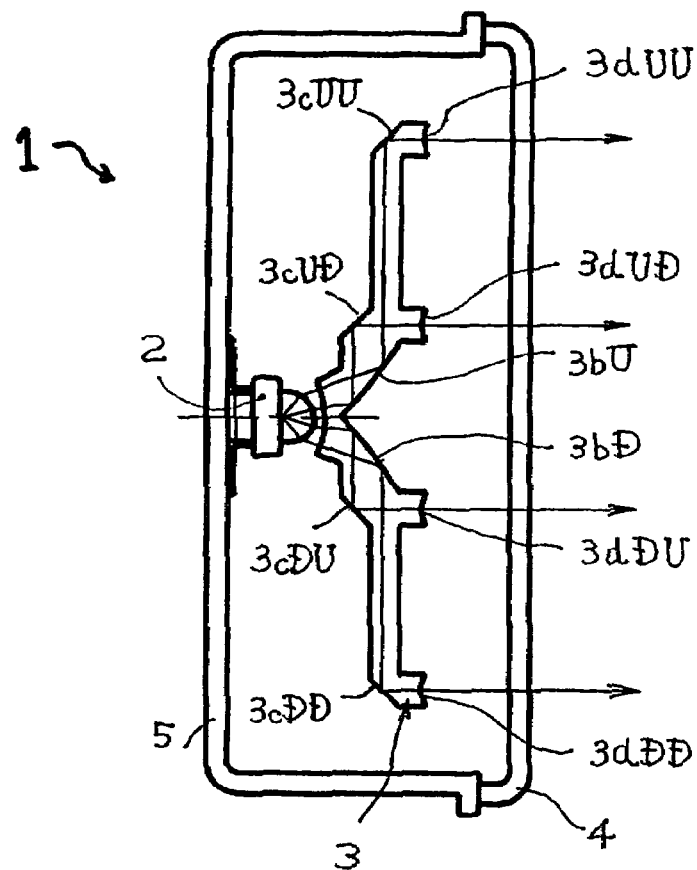
FIG. 3 is a cross-sectional view showing another embodiment of a lamp made in accordance with the principles of the present invention.

FIG. 3 shows another embodiment of a lamp 1 made in accordance with the principles of the present invention. In the embodiment of FIG. 1, for each one of the first reflecting surfaces 3b (for example, the upper first reflecting surface 3bU), one of the second reflecting surfaces 3c (for example, the upper second reflecting surface 3cU) is provided. In the embodiment of FIG. 3, to the contrary, for one first reflecting surface, two second reflecting surfaces can be provided.

In FIG. 3, the first reflecting surfaces 3*b* can include two surfaces, that is, the upper first reflecting surface 3*b*U and the lower first reflecting surface 3*b*D, which can be provided to split the light from the LED lamp 2 in two direction, e.g., an upward and a downward direction. This structure may be similar in function and structure to that of the embodiment shown in FIG. 1. For the upper first reflecting surface 3*b*U, however, an upper-high second reflecting surface 3*c*UU and an upper-low second reflecting surface 3*c*UD can be provided to further split the light from the upper first reflecting surface 3*b*U in two.

For the lower first reflecting surface 3*b*D, a lower-high second reflecting surface 3*c*DU and a lower-low second reflecting surface 3*c*DD can be provided to further split the light from the lower first reflecting surface 3*b*D in two. Accordingly, lenses corresponding to the respective second reflecting surfaces can include an upper-high lens 3*d*UU, an upper-low lens 3*d*UD, a lower-high lens 3*d*DU and a lower-low lens 3*d*DD provided at four locations.

Thus, the light from a row of LED lamps 2 can be split in four rows of light, which can be utilized as the irradiation light from the lamp 1 with a resulting increased emission area that can improve the visibility from other cars and passersby.

Figure 4:
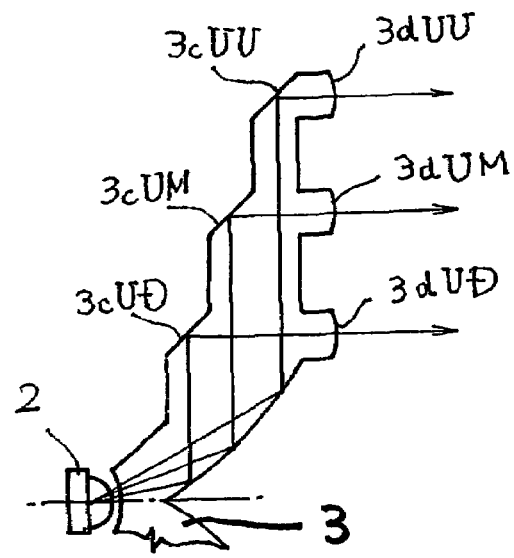
FIG. 4 is a partial cross-sectional view of yet another embodiment of a lamp made in accordance with the principles of the present invention.

Alternatively, as illustrated in FIG. 4, another embodiment of a lamp 1 can include a first reflecting surface 3*b* that is associated with many different second reflecting surfaces. For example, three second reflecting surfaces (3*c*UU, 3*c*UM, 3*c*UD) and lenses (3*d*UU, 3*d*UM, 3*d*UD) may be provided as shown. This construction can be effective to improve or change the quality of display of the lamp 1 such that it approximates a surface type emission.

Figure 5:
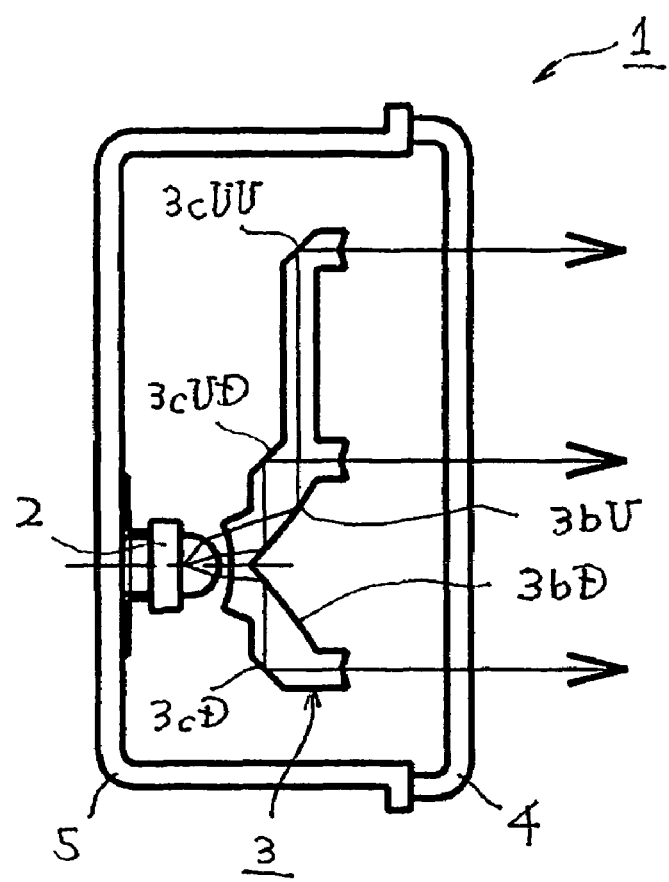
FIG. 5 is a cross-sectional view showing still another embodiment of a lamp made in accordance with the principles of the present invention.

FIG. 5 shows another embodiment of a lamp made in accordance with the principles of the present invention. In the above descriptions of embodiments of the invention, equal numbers of upper and lower second reflecting surfaces 3*c* are combined with a pair of upper and lower first reflecting surfaces 3*b*(U, D). The present invention is not limited to such cases. For example, as shown, two second reflecting surfaces 3*c*(UU, UD) can be combined with one first reflecting surface 3*b*U while one second reflecting surface 3*c*D can be combined with one first reflecting surface 3*b*D.

The lamp 1 has been developed in the art for the purpose of use as a lamp for transmitting signals to other cars and passersby, for example, as a tail lamp and a turn signal lamp. Recent LED lamps are remarkable because an increased driving current and an increased amount of light are possible. Accordingly, their use can be adequately considered for illumination lamps such as a headlamp and a fog lamp. In addition, there may be numerous other applications for the lamp of the present invention. For example, the lamp can be used in traffic signal lamps, household lamps, night lamps, interior illumination lamps, and other lamps.

Structures and features different from those disclosed above can be used without departing from the spirit and scope of the present invention. For example, the LED lamps can be arranged in multiple rows with corresponding optical guide paths located adjacent some or all of the rows. In addition, the LED lamps can be configured along non-linear, curved or zig-zagged rows. The reflective surfaces can include additional materials or structures to cause or help assist in the reflection of the light within the optical guide path. In addition, the lamp can include a lens or other optical structure immediately adjacent the LED lamp(s) and possibly in front of the optical guide path. In addition, different optical structures can also be placed at the emission end of the optical guide path to change, redirect, focus, diffuse, etc., light emitted from the optical guide path.

The high refractivity material portion of the optical guide path 3 can be contiguous or non-contiguous. In addition, the high refractivity material portion can be made from various optical materials well known in the art. It is also not necessary for the optical guide path 3 to be integral, uniform or contiguous and still be consistent with the principles of the invention. The lens(es) 3*d* can be integrally formed with the optical guide path 3 or can be separately constructed. In addition, the lens(es) 3*d* can be shaped in various manners depending on the shape or distribution of light that is desired from the lamp 1. In addition, the lens(es) 3*d* can be made of various known optical materials and colored as desired.

Having described preferred embodiments consistent with the invention, other embodiments and variations consistent with the invention will be apparent to those skilled in the art. Therefore, the invention should not be viewed as limited to the disclosed embodiments but rather should be viewed as limited only by the spirit and scope of the appended claims.

What is claimed is:

1. A lamp device, comprising:
 a plurality of LED lamps capable of emitting light; and
 an optical guide path extending from adjacent said LED lamps, the optical guide path including a high-refractivity material portion, a direction change structure configured to change the direction of light emitted from said LED lamps into an irradiation direction, and a light distribution pattern formation structure configured to impart an appropriate light distribution pattern to light radiated in said irradiation direction, wherein
 said direction change structure includes a first reflecting surface and a second reflecting surface, the first and second reflecting surfaces being located so as to provide inner reflection at an interface between the high-refractivity material portion and atmosphere, the first reflecting surface extending continuously and substantially parallel to an imaginary line connecting the plurality of LED lamps such that light from each of the plurality of LED lamps is reflected by the first reflecting surface, and the second reflecting surface extending continuously and substantially parallel to the imaginary line connecting the plurality of LED lamps, and
 said light distribution pattern formation device includes a diffusion lens, said lens being located at an interface between the high-refractivity material portion and atmosphere.

2. The lamp device according to claim 1, wherein the plurality of LED lamps are aligned in parallel to form a row, and said optical guide path has a shape corresponding to the row of said LED lamps.

3. The lamp device according to claim 1, further comprising:
 a plurality of said second reflecting surfaces, a plurality of said lenses and a plurality of said first reflecting surfaces.

4. The lamp device according to claim 1, wherein said first and second reflecting surfaces are located in relation to said LED lamps so as to divide light from said LED lamps into two directions.

5. The lamp device according to claim 2, further comprising:
 a plurality of said second reflecting surfaces, a plurality of said lenses, and a plurality of said first reflecting surfaces.

6. The lamp device according to claim 2, wherein said first and second reflecting surfaces are located in relation to said LED lamps so as to divide light from said LED lamps into two directions.

7. The lamp device according to claim 3, wherein said first and second reflecting surfaces are located in relation to said LED lamps so as to divide light from said LED lamps into two directions.

8. The lamp device according to claim 5, wherein said first and second reflecting surfaces are located in relation to said LED lamps so as to divide light from said LED lamps into two directions.

9. The lamp device according to claim 1, wherein at least one of the first and second reflecting surfaces is configured so as to provide inner total reflection at an interface between the high-refractivity material portion and atmosphere.

10. The lamp device according to claim 1, wherein the lamp is configured for use as a vehicle lamp.

11. The lamp device according to claim 1, wherein one of the first reflecting surface and the second reflecting surface is at an angle of approximately 45 degrees with respect to the irradiation direction.

12. The lamp device according to claim 1, further comprising:
a casing located adjacent the LED lamps and including an aperture;
a cover lens located adjacent the aperture of the casing.

13. A lamp device, comprising:
a plurality of LED lamps capable of emitting light; and
an optical guide path extending from adjacent said LED lamps, the optical guide path integrally formed from a high-refractivity material and including an integral first reflecting surface and an integral second reflecting surface, the first and second reflecting surfaces being formed from an interface between the high-refractivity material and atmosphere, the first reflecting surface extending continuously and substantially parallel to an imaginary line connecting the plurality of LED lamps, and the second reflecting surface extending continuously and substantially parallel to the imaginary line connecting the plurality of LED lamps such that light from each of the plurality of LED lamps is reflected by the second reflecting surface, and the first and second reflecting surfaces configured to re-direct light emitted from the LED lamps though the optical guide path.

14. The lamp device according to claim 13, wherein a the plurality of LED lamps are aligned in parallel to form a row, and wherein said optical guide path has a shape corresponding to the row of said LED lamps.

15. The lamp device of claim 13, further comprising:
a plurality of said first reflective surfaces configured such that they divide the light emitted from the LED lamp into two separate light beams.

16. The lamp device of claim 13, further comprising:
a plurality of said second reflecting surfaces,
a plurality of lenses, each lens associated with a respective second reflecting surface to create a particular light distribution for the lamp device.

17. The lamp device of claim 13, further comprising:
at least one lens integrally formed in the optical guide path and configured to diffuse light passing though the optical guide path.

18. A method of using a lamp device, comprising:
providing a lamp that includes a plurality of LED lamps formed along a row, an optical guide path extending from adjacent said LED lamps, the optical guide path including a high-refractivity material portion, a plurality of first reflecting surfaces, and a plurality of second reflecting surfaces;
illuminating the plurality of LED lamps;
dividing the light into at least two separate light beams by the plurality of first reflecting surfaces of the optical guide path; and
directing the at least two separate light beams by the plurality of second reflecting surfaces
such that a first of the two separate light beams forms a first row of emitted light located above and extending substantially parallel to the row formed by the plurality of LED lamps, and a second of the two separate light beams forms a second row of emitted light located above and extending substantially parallel to the row formed by the plurality of LED lamps.

19. The method of claim 18, wherein providing includes providing at least one lens, and directing includes emitting light via the at least one lens.

20. The method of claim 18, wherein dividing the light includes dividing the light a second time using at least one additional second reflecting surface.

* * * * *